(12) United States Patent
Trivedi et al.

(10) Patent No.: US 11,988,095 B2
(45) Date of Patent: May 21, 2024

(54) SEALS FOR MANAGING THERMAL DISTORTION IN A TURBOMACHINE AND METHODS FOR BUILDING THE SAME

(71) Applicant: General Electric Company, Schenectady, NY (US)

(72) Inventors: Deepak Trivedi, Niskayuna, NY (US); Rahul Anil Bidkar, Niskayuna, NY (US); Uttara Vijay Kumar, Glenville, NY (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 17/685,953

(22) Filed: Mar. 3, 2022

(65) Prior Publication Data

US 2023/0279780 A1     Sep. 7, 2023

(51) Int. Cl.
*F01D 11/00* (2006.01)
*F01D 11/04* (2006.01)
(Continued)

(52) U.S. Cl.
CPC ............ *F01D 11/001* (2013.01); *F01D 11/04* (2013.01); *F01D 25/28* (2013.01); *B33Y 80/00* (2014.12); *F05D 2230/24* (2013.01); *F05D 2230/31* (2013.01); *F05D 2240/55* (2013.01); *F05D 2250/73* (2013.01); *F05D 2260/38* (2013.01); *F05D 2300/50212* (2013.01); *F05D 2300/603* (2013.01)

(58) Field of Classification Search
CPC .......... F16J 15/3496; F16J 15/40; F16J 15/44; F16J 15/441; F16J 15/445; F01D 11/001; F01D 11/04; F01D 25/28; B33Y 80/00; F05D 2240/55; F05D 2240/73; F05D 2260/38; F05D 2230/24; F05D 2230/31; F05D 2230/50212; F05D 2230/603
See application file for complete search history.

(56) References Cited

U.S. PATENT DOCUMENTS

| | | |
|---|---|---|
| 7,845,648 B2 | 12/2010 | Keefe et al. |
| 8,109,042 B2 | 2/2012 | McKnight et al. |

(Continued)

FOREIGN PATENT DOCUMENTS

| | | | | |
|---|---|---|---|---|
| CN | 109163018 A | 1/2019 | | |
| EP | 4019813 A1 * | 6/2022 | .......... | F04B 39/0005 |

(Continued)

*Primary Examiner* — Gilbert Y Lee
(74) *Attorney, Agent, or Firm* — Dority & Manning, P.A.

(57) ABSTRACT

A seal assembly for a component of a turbomachine and method of assembly thereof is provided. The seal assembly includes at least one mating face positioned adjacent to the component and a seal coupled to the mating face. The seal includes an outer shell defining an interior space; an inner matrix filling the interior space comprising a plurality of unit cells comprising one or more metamaterials, wherein at least a portion of the plurality of unit cells are identical, and wherein the plurality of unit cells are repeated throughout the inner matrix; and one or more support struts extending throughout the inner matrix. The method of building the seal assembly may include selecting a first material for the outer shell and selecting the one or more metamaterials for the inner matrix based on the first material.

20 Claims, 10 Drawing Sheets

(51) Int. Cl.
   *F01D 25/28*   (2006.01)
   *F16J 15/40*   (2006.01)
   *B33Y 80/00*   (2015.01)

(56) References Cited

U.S. PATENT DOCUMENTS

| | | | |
|---|---|---|---|
| 9,709,274 | B2 | 7/2017 | Innes |
| 2008/0014077 | A1* | 1/2008 | Hopkins ............... F01D 11/122 |
| | | | 415/174.4 |
| 2015/0345320 | A1 | 12/2015 | Webb |
| 2017/0370581 | A1 | 12/2017 | Bertoldi et al. |
| 2020/0191162 | A1 | 6/2020 | Weihard et al. |
| 2022/0282790 | A1* | 9/2022 | Craig ................... F16J 15/3284 |

FOREIGN PATENT DOCUMENTS

| | | |
|---|---|---|
| JP | 2020133567 A | 8/2020 |
| JP | 2020133568 A | 8/2020 |
| WO | WO2021118950 A1 | 6/2021 |

\* cited by examiner

SEALS FOR MANAGING THERMAL DISTORTION IN A TURBOMACHINE AND METHODS FOR BUILDING THE SAME

GOVERNMENT CONTRACT

This disclosure was made with government support under contract number DE-FE0024007 awarded by Department of Energy. The government has certain rights in the disclosure.

FIELD

The present disclosure relates to a turbomachine, and, more particularly, a seal for managing thermal distortion in a turbomachine.

BACKGROUND

Various types of turbomachinery, such as gas turbine engines and steam turbine engines, are known and widely used for power generation, propulsion, and the like. The efficiency of the turbomachinery may depend in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps along a flow path from regions of high-pressure to regions of low-pressure may result in poor efficiency for the turbo-machinery. The flow path includes, in a serial-flow relationship, a fluid inlet, a turbine, and a fluid outlet. Such leakage along the flow path may impact efficiency in that the leaked fluids fail to perform useful work.

Different types of sealing systems are used to minimize the leakage of fluid flowing through turbomachinery. The sealing systems, however, often are subject to relatively high temperatures, thermal gradients, and thermal and mechanical expansion and contraction during various operational stages that may increase or decrease the clearance therethrough. For example, labyrinth seals and aspirating seals may have shorter lifespans due to the extreme operating conditions, thereby leading to inefficient performance.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
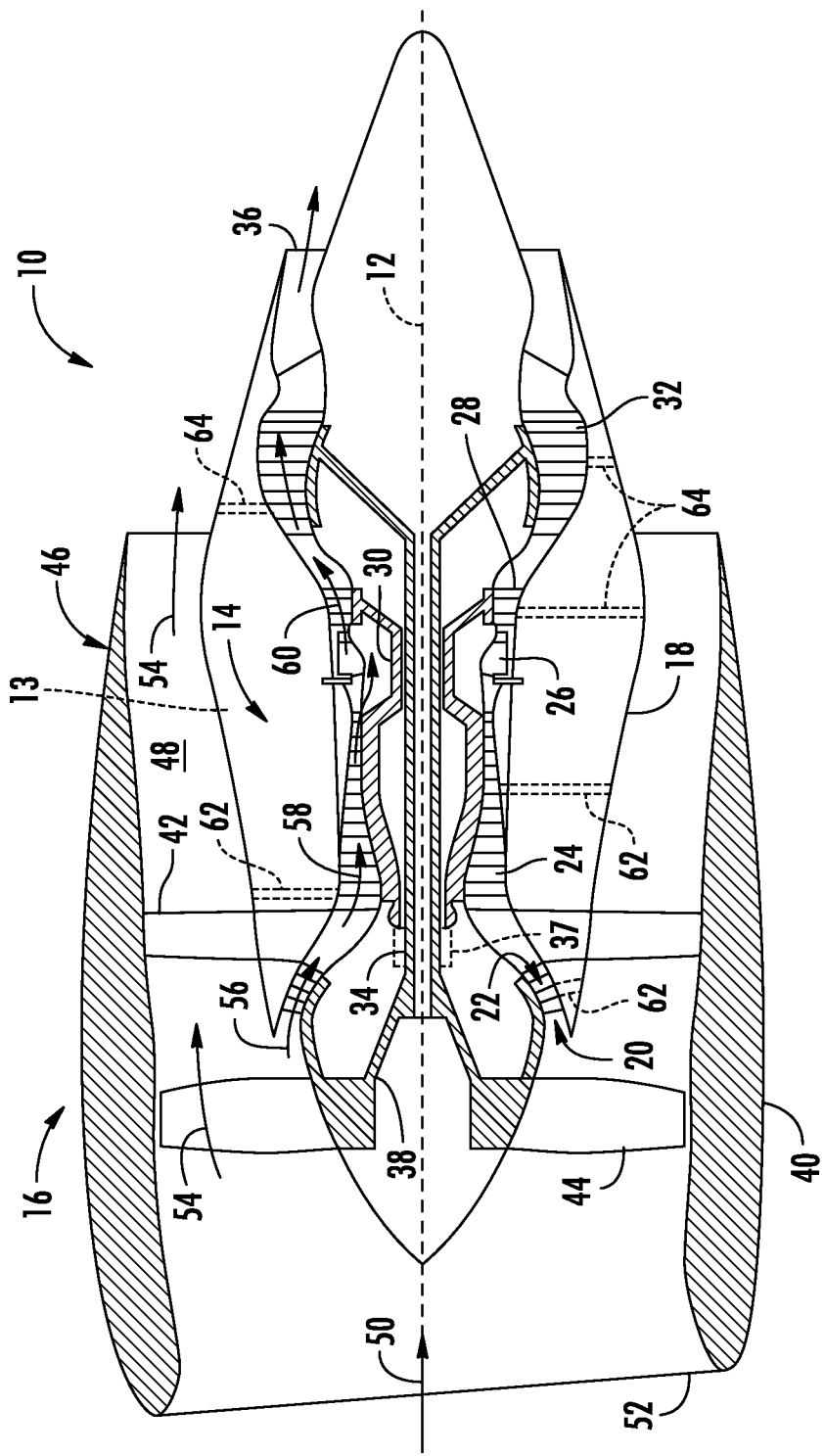
FIG. 1 is a schematic representation of an exemplary turbomachine which may be inspected according to one or more embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first," "second," and "third" may be used interchangeably to distinguish one component from another and are not intended to signify location or importance of the individual components.

The terms "forward" and "aft" refer to relative positions within a turbomachine or vehicle, and refer to the normal operational attitude of the turbomachine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The terms "gas turbine engine" and "steam turbine engine" refer to an engine having a turbomachine as all or a portion of its power source. Example gas turbine engines and/or steam turbine engines may include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high," or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As used herein, the terms "integral," "unitary," or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Generally, seal assemblies may be positioned between a stationary component and a rotary component to provide sealing between the high-pressure area and the low-pressure area. These seal assemblies may include aspirating seals and/or labyrinth seals; however, these seals may distort in high temperatures and/or high-pressure. Accordingly, an improved seal assembly capable of withstanding extreme operating conditions would be welcomed in the art.

The present disclosure is generally related to a seal assembly for a turbomachine that includes at least one mating face and a seal. The seal includes an outer shell defining an interior space, an inner matrix filling the interior space, and support struts extending throughout the inner matrix. The inner matrix further includes a plurality of unit cells having one or more metamaterials, where at least a portion of the plurality of unit cells are identical, and where the plurality of unit cells are repeated throughout the inner matrix.

Referring now to the drawings, wherein identical numerals indicate the same elements throughout the figures, FIG. 1 illustrates a cross-sectional view of one embodiment of a turbomachine 10 that may be utilized within an aircraft in accordance with aspects of the present subject matter, with the turbomachine 10 being shown having a longitudinal or centerline axis 12 extending therethrough for reference purposes. In general, the turbomachine 10 may include an engine frame 13, a core engine 14 (indicated generally), and a fan section 16 positioned upstream thereof. The core engine 14 may generally include an outer casing 18 that is substantially tubular and defines an annular inlet 20. In addition, the outer casing 18 is mounted to the engine frame 13 and may further enclose and support a low-pressure (booster) compressor 22 for increasing the pressure of the air that enters the core engine 14 to a first pressure level. A high-pressure, multi-stage, axial-flow high-pressure compressor 24 may then receive the pressurized air from the low-pressure compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the turbomachine 10 to a first high-pressure turbine 28 for driving the high-pressure compressor 24 via a first high-pressure drive shaft 30, and then to the low-pressure turbine 32 for driving the low-pressure compressor 22 and fan section 16 via a second low-pressure drive shaft 34 that is generally coaxial with first drive shaft 30. After driving each of the high-pressure turbine 28 and the low-pressure turbine 32, the combustion products may be expelled from the core engine 14 via an exhaust nozzle 36 to provide propulsive jet thrust.

It should be appreciated that each of the low-pressure compressor 22 and the high-pressure compressor 24 may include a plurality of compressor stages, with each stage including both an annular array of stationary compressor vanes and an annular array of rotating compressor blades positioned immediately downstream of the compressor vanes. Similarly, each of the high-pressure turbine 28 and the low-pressure turbine 32 may include a plurality of turbine stages, with each stage including both an annular array of stationary nozzle vanes and an annular array of rotating turbine blades positioned immediately downstream of the nozzle vanes.

Additionally, as shown in FIG. 1, the fan section 16 of the turbomachine 10 may generally include a rotatable, axial-flow fan rotor assembly 38 (hereinafter "rotor 38") that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the rotor 38 and its corresponding fan blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low-pressure) drive shaft 34 may be directly coupled to the rotor 38 to provide a direct-drive configuration. Alternatively, the second low-pressure drive shaft 34 may be coupled to the rotor 38 via a speed reduction device 37 (e.g., a reduction gear or gearbox) to provide an indirect-drive or geared drive configuration. Such a speed reduction device(s) may also be provided between any other suitable shafts and/or spools within the turbomachine 10 as desired or required.

During operation of the turbomachine 10, it should be appreciated that an initial airflow 50 (indicated by an arrow) may enter the turbomachine 10 through an associated inlet 52 of the fan casing 40. The airflow 50 then passes through the fan blades 44 and splits into a first compressed airflow 54 (indicated by an arrow) that moves through airflow conduit 48 and a second compressed airflow 56 (indicated by an arrow) which enters the low-pressure compressor 22. The pressure of the second compressed airflow 56 is then increased and enters the high-pressure compressor 24 (as indicated by arrow 58). After mixing with fuel and being combusted within the combustor 26, the combustion products 60 exit the combustor 26 and flow through the high-pressure turbine 28. Thereafter, the combustion products 60 flow through low-pressure turbine 32 and exit the exhaust nozzle 36 to provide thrust for the turbomachine 10.

As indicated above, the turbomachine 10 may also include a plurality of access ports defined through its casings and/or engine frame 13 for providing access to the interior of the core engine 14. For instance, as shown in FIG. 1, the turbomachine 10 may include a plurality of compressor access ports 62 (only three of which are shown) defined through the outer casing 18 for providing internal access to one or both of the low-pressure compressor 22 and high-pressure compressor 24. Similarly, as shown in the illustrated embodiment, the turbomachine 10 may include a plurality of turbine access ports 64 (only three of which are shown) defined through the outer casing 18 for providing internal access to one or both of the high-pressure turbine 28 and the low-pressure turbine 32. In several embodiments, the plurality of compressor access ports 62 and/or the plurality of turbine access ports 64 may be spaced apart axially along the core engine 14. For instance, the plurality of compressor access ports 62 may be spaced apart axially along each of the low-pressure compressor 22 and the high-pressure compressor 24 such that at least one or the plurality of compressor access ports 62 is located at each compressor stage for providing access to the compressor vanes and blades located within such stage. Similarly, the plurality of turbine access ports 64 may be spaced apart axially along each of the high-pressure turbine 28 and the low-pressure turbine 32 such that at least one access port 64 is located at each turbine stage for providing access to the nozzle vanes and turbine blades located within such stage.

It should be appreciated that, although the plurality of compressor access ports 62 and the plurality of turbine access ports 64 are generally described herein with reference to providing internal access to one or both of the low-pressure compressor 22 and the high-pressure compressor 24, and/or for providing internal access to one or both of the high-pressure turbine 28 and the low-pressure turbine 32. The turbomachine 10 may include access ports providing access to any suitable internal location of the turbomachine 10, such as by including access ports that provide access within the combustor 26 and/or any other suitable component of the turbomachine 10. Furthermore, the present disclosure may be used to inspect any component of the turbomachine 10.

It will be appreciated that the turbomachine 10 depicted in FIG. 1 and described above is provided by way of example only. In other embodiments, the turbomachine 10 may have any other suitable configuration, such as a geared connection with the fan blades 44; a variable pitch fan; any suitable number of shafts/spools, compressors, or turbines; etc. Additionally, although depicted as a ducted turbofan engine, in other embodiments, the turbomachine 10 may be configured as an unducted turbofan engine, a turboshaft engine, a turboprop engine, a turbojet engine, etc.

Figure 2:
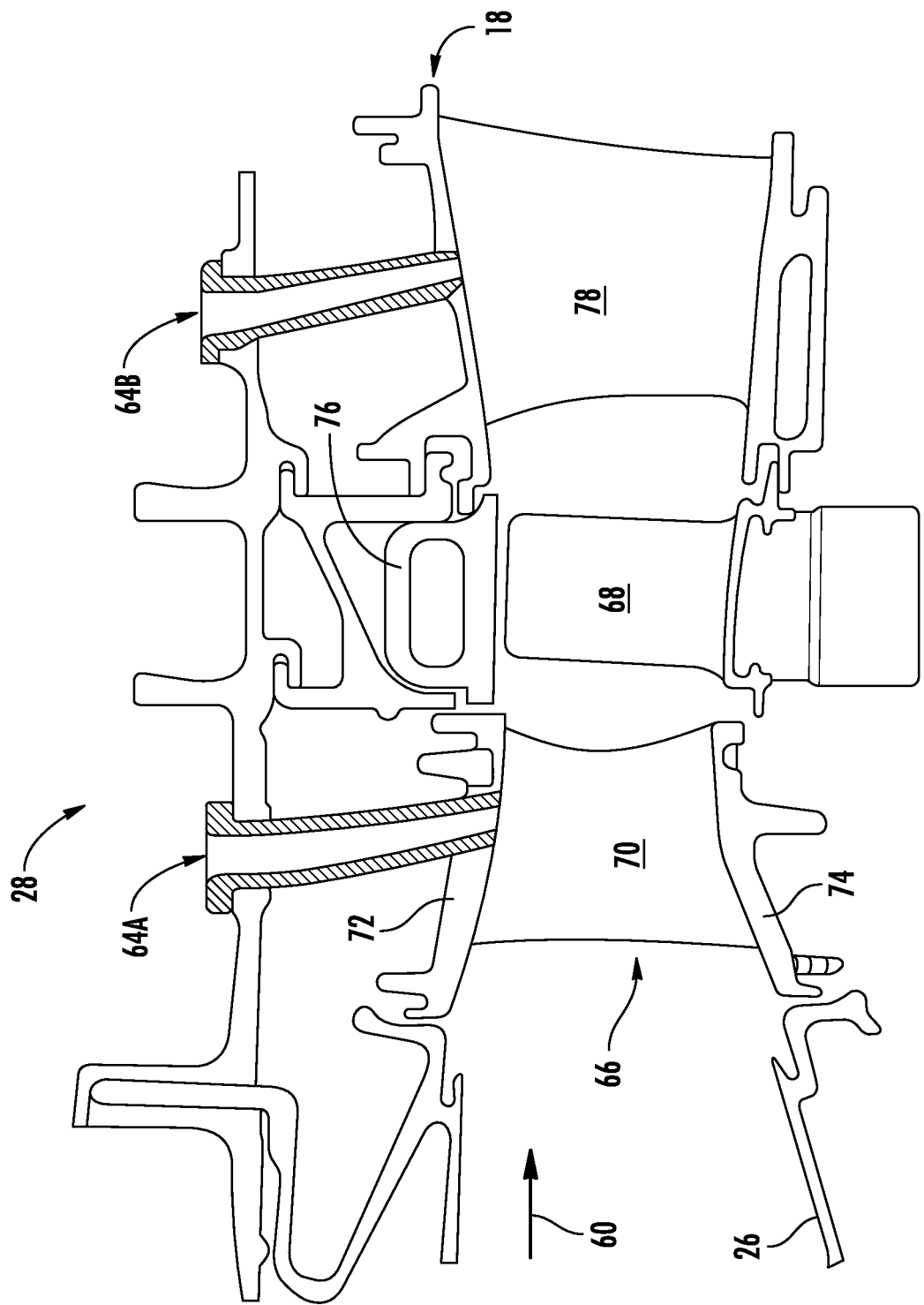
FIG. 2 is a partial, cross-sectional view of a high-pressure turbine within the turbomachine according to one or more embodiments of the present disclosure.

Referring now to FIG. 2, a partial, cross-sectional view of the first or high-pressure turbine 28 described above with reference to FIG. 1 is illustrated in accordance with embodiments of the present subject matter. As shown, the high-pressure turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of nozzle vanes 70 that are radially-extending and circularly-spaced (one of which is shown). The plurality of nozzle vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the turbomachine 10. Moreover, a turbine shroud 76 may be positioned immediately adjacent to the radially outer tips of the turbine blades 68 so as to define the outer radial flowpath boundary for the combustion products 60 flowing through the high-pressure turbine 28 along the hot gas path of the turbomachine 10.

As indicated above, the high-pressure turbine 28 may generally include any number of turbine stages, with each stage including an annular array of nozzle vanes and follow-up turbine blades 68. For example, as shown in FIG. 2, an annular array of nozzle vanes 78 of a second stage of the high-pressure turbine 28 may be located immediately downstream of the turbine blades 68 of the first stage of the high-pressure turbine 28.

Moreover, as shown in FIG. 2, a plurality of access ports 64 may be defined through the outer casing 18 and/or engine frame 13 (not shown), with each access port 64 being configured to provide access to the interior of the high-pressure turbine 28 at a different axial location. Specifically, as indicated above, the access ports 64 may, in several embodiments, be spaced apart axially such that each access port 64 is aligned with or otherwise provides interior access to a different stage of the high-pressure turbine 28. For instance, as shown in FIG. 2, a first access port 64A may be defined through the outer casing 18 to provide access to the first stage of the high-pressure turbine 28 while a second access port 64B may be defined through the outer casing 18 to provide access to the second stage of the high-pressure turbine 28.

It should be appreciated that similar access ports 64 may also be provided for any other stages of the turbine 28 and/or for any turbine stages of the second (or low-pressure) turbine 32. It should also be appreciated that, in addition to the axially spaced access ports 64 shown in FIG. 2, access ports may be provided at differing circumferentially spaced locations. For instance, in one embodiment, a plurality of circumferentially spaced access ports may be defined through the outer casing 18 at each turbine stage to provide interior access to the turbine 28 at multiple circumferential locations around the turbine stage.

Figure 3:
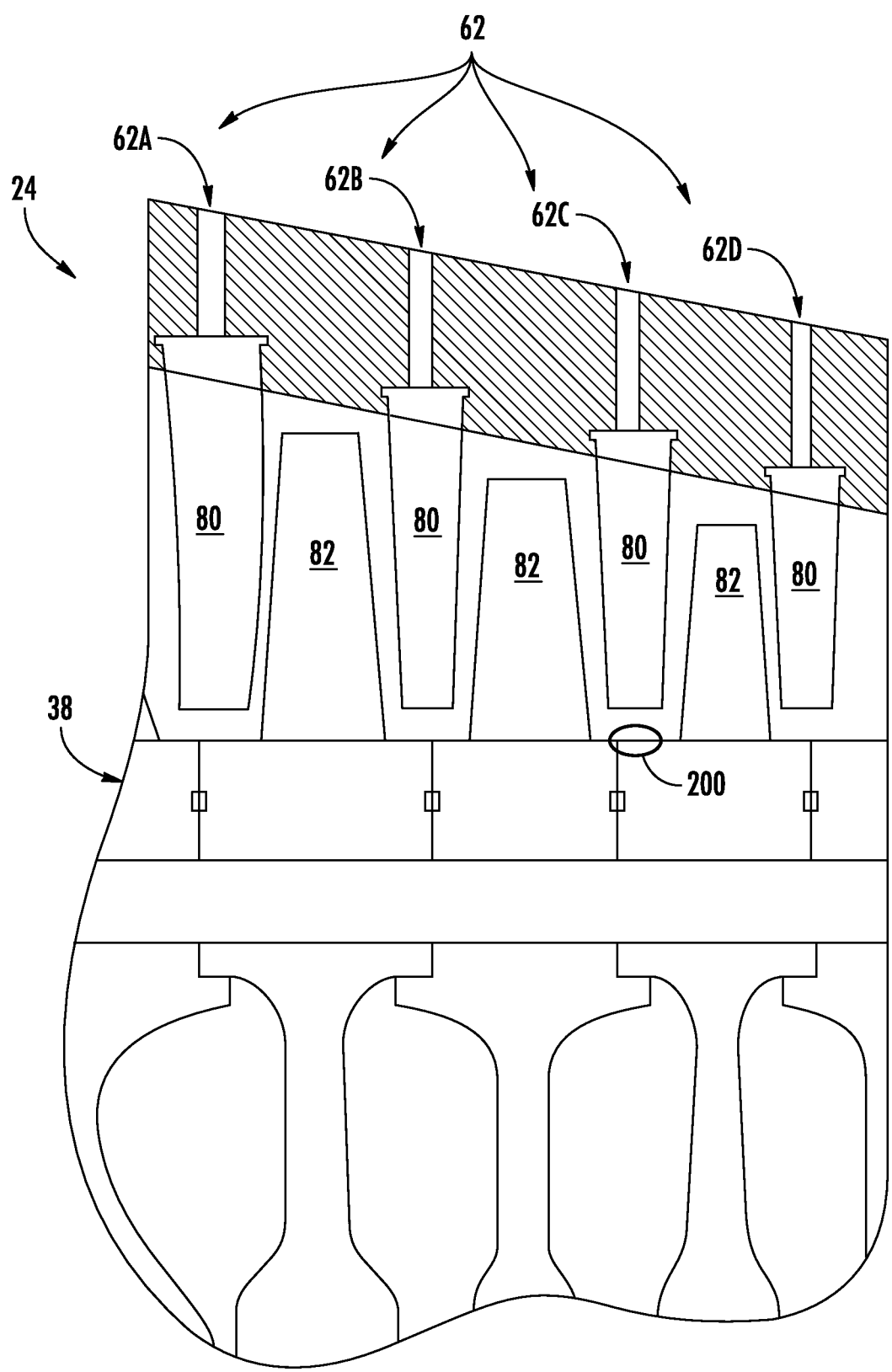
FIG. 3 shows a cross-sectional illustration of a high-pressure compressor with a plurality of compressor stages according to one or more embodiments of the present disclosure.

Referring now to FIG. 3, a partial, cross-sectional view of the high-pressure compressor 24 described above with reference to FIG. 1 is illustrated in accordance with embodiments of the present subject matter. As shown, the high-pressure compressor 24 may include a plurality of compressor stages, with each stage including both an annular array of fixed compressor vanes, e.g., stator vanes such as the stator 80 (only one of which is shown for each stage) and an annular array of rotor blades 82 (only one of which is shown for each stage). Each row of the stator vanes is generally configured to direct air flowing through the high-pressure compressor 24 to the row of rotor blades 82 immediately downstream thereof. As will be discussed more in depth below, a seal assembly 200 may be positioned between the stator 80 and the rotor 38.

Moreover, as indicated above, the high-pressure compressor 24 may include the plurality of compressor access ports 62 defined through a compressor casing 19 and/or engine frame 13 (not shown), with each access port of the plurality of compressor access ports 62 being configured to provide access to the interior of the high-pressure compressor 24 at a different axial location. Specifically, in several embodiments, the plurality of compressor access ports 62 may be spaced apart axially such that each access port of the plurality of compressor ports 62 is aligned with or otherwise provides interior access to a different stage of the high-pressure compressor 24. For instance, as shown in FIG. 3, first access port 62A, second access port 62B, third access port 62C, and fourth access port 62D are illustrated that provide access to four successive stages, respectively, of the high-pressure compressor 24. It should be appreciated that similar access ports may also be provided for any of the other stages of the high-pressure compressor 24 and/or for any of the stages of the low-pressure compressor 22.

Figure 4:
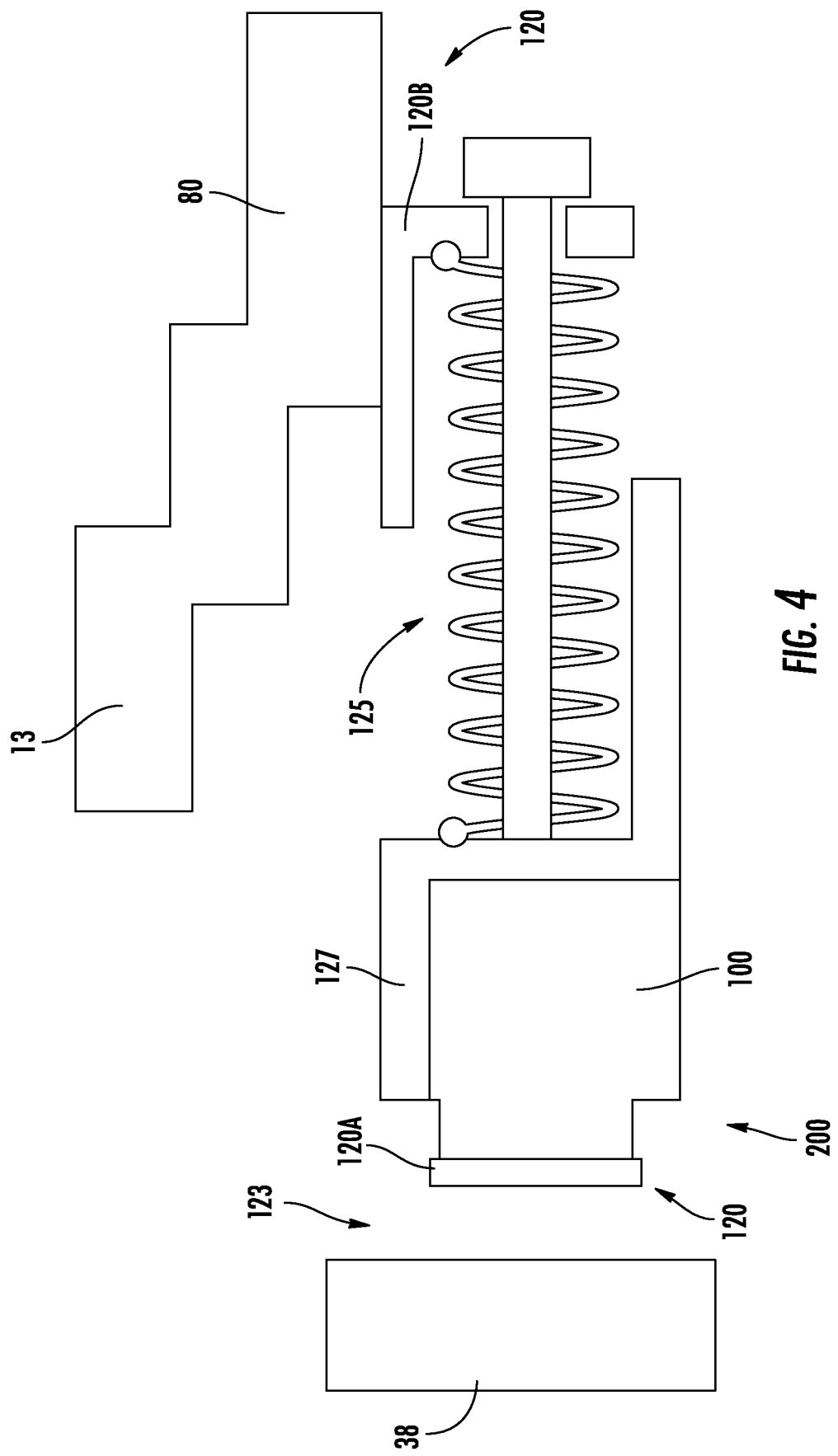
FIG. 4 is a schematic of an exemplary seal assembly within the turbomachine according to one or more embodiments of the present disclosure.
Figure 5:
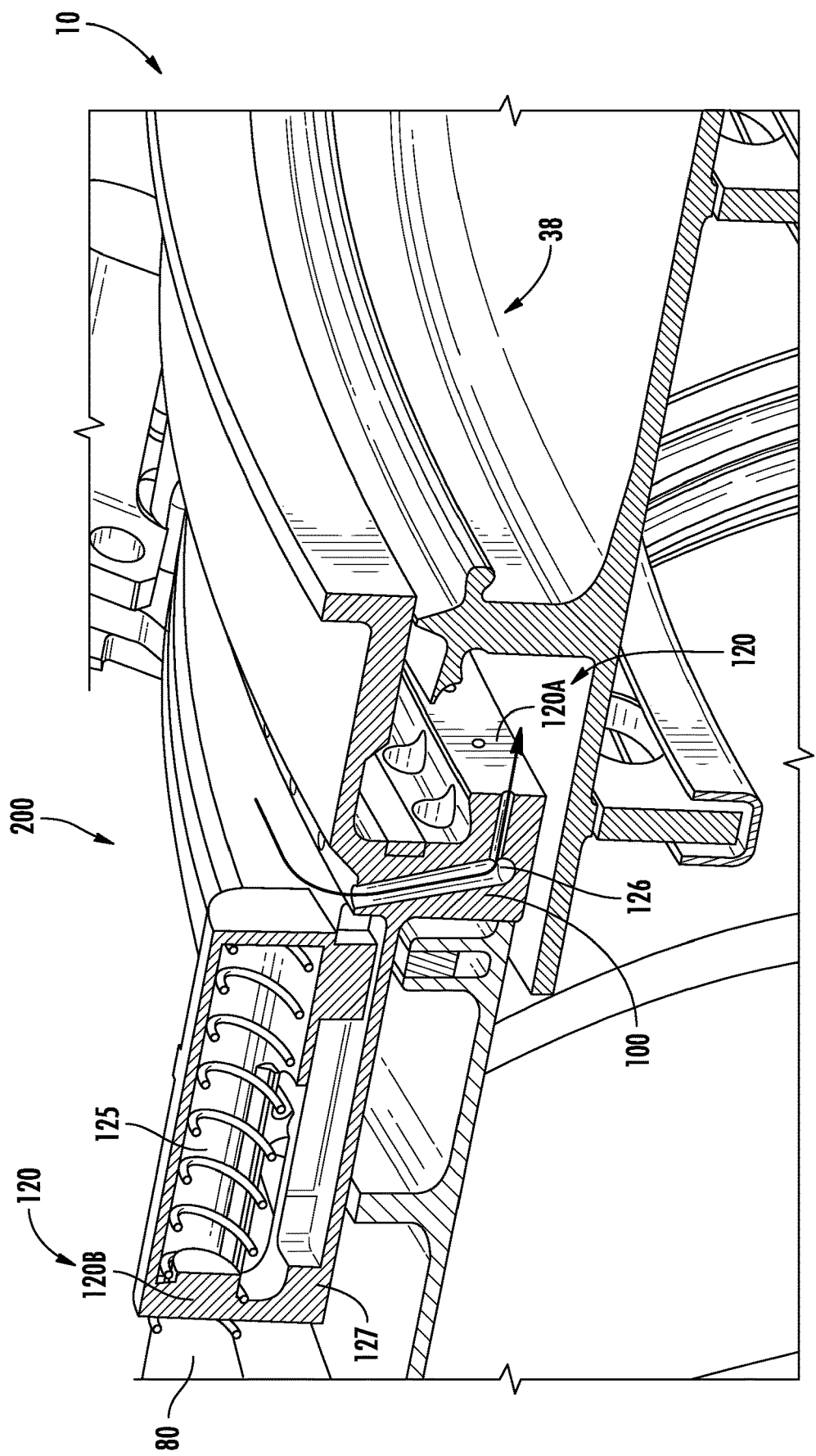
FIG. 5 is a drawing of a cross-sectional view of an exemplary seal assembly within the turbomachine.

Referring now to FIGS. 4 and 5, the seal assembly 200 includes at least one mating face 120, a spring 125, and a seal 100 for a turbomachine 10. In some embodiments, e.g., as shown in FIGS. 4 and 5, the seal assembly 200 may include two mating faces, such as a first mating face 120A and a second mating face 120B. The spring 125 is positioned between the seal 100 and a mating face, such as the second mating face 120B, as illustrated. Further, the spring 125 maintains a gap 123, or face seal clearance, between the seal 100 and a component of the turbomachine 10, such that the seal 100 does not rub against the component. The seal assembly 200 may further include a ring carrier 127, where the ring carrier is configured to attach the seal 100 to the spring 125. The seal 100 may include an outer shell 110 that the ring carrier 127 is coupled to.

The seal assembly 200 may generally be positioned within the turbomachine 10, e.g., between a first component and a second component of the turbomachine 10. In some embodiments, such as the embodiment of FIG. 5, the first component is the rotor 38, and the second component is the stator 80. The first component may also have a mating face where the seal assembly 200 is adjacent the first component, such as a rotor mating face (not shown) where the first component is the rotor 38. Similarly, the second component, or stator 80, may have a stator mating face (not shown) where the seal assembly 200 is adjacent the second component. Although the terms "rotor mating face" and "stator mating face" are used herein, these mating faces are not restricted to use only where the first component is the rotor 38 and the second component is the stator 80. Rather, rotor mating face and stator mating face may refer to mating faces of other components within the turbomachine 10 as well. Additionally, in at least some embodiments, the at least one mating face 120 may be a bearing mating face, e.g., with a rolling interface.

The at least one mating face 120, e.g., the first mating face 120A may, in exemplary embodiments, face a heated component of the turbomachine 10. Therefore, the at least one mating face 120 may be subject to thermal distortion due to the heat from the heated component. It may be more difficult to prevent thermal distortion of the first mating face 120A as the gap 123 or distance between the first mating face 120A and the rotating component (e.g., rotor 38) increases. In some embodiments, the at least one mating face 120 may be part of a face seal assembly (not shown), where the face seal assembly further includes a first internal cavity, a second internal cavity, a fluid channel fluidically coupling the first internal cavity and the second internal cavity, and a plurality of isolated hydrostatic ports extending from the first internal cavity to the at least one mating face 120. For example, as shown in FIG. 5, air and/or fluid (as indicated by the arrow) flows through an isolated hydrostatic port 126 to the first mating face 120A. The air or fluid may help the seal assembly 200 form a film seal against the rotor 38 by pressurizing the seal assembly 200. In exemplary embodiments, the film formed by the seal 100 may have a thickness of between about 0.25 mils and about 10 mils, such as between about 0.25 mils and about 8 mils, or such as between about 0.25 mils and about 6 mils.

During operation of the seal assembly 200, the rotating component, e.g., rotor 38, may start rotating by a rubbing contact with the ring. This may be because, at zero speed (i.e., stationary conditions) or low speeds, the rotating component may not generate enough separating forces to lift-off the at least one mating face 120. In such conditions, the plurality of isolated hydrostatic ports may be used to lift-off the at least one mating face 120. For example, at zero speed condition, the isolated hydrostatic ports may inject the pressurized fluid against the rotor sealing face to generate the separating force which is adequate to lift-off the at least one mating face 120. Thereby, the pressurized fluid produces a thin fluid-film there between the rotating component bearing face and the at least one mating face 120. The rotating component may then spin, and the rotor sealing face and the at least one mating face 120 will not get damaged by start-up rubs.

As shown in FIGS. 4, 5, 6, 7, and 8, the outer shell 110 is coupled to the at least one mating face 120, such as the first mating face 120A and the second mating face 120B, for joining with the turbomachine 10 (shown as a box for illustrative purposes). The at least one mating face 120 may be coupled to the outer shell 110 at manufacture. For example, if the outer shell 110 is printed via additive manufacturing, the at least one mating face 120 may be printed and joined simultaneously with the outer shell 110. In some exemplary embodiments, the first mating face 120A may be positioned adjacent to the first component such as the high-pressure turbine 28 or the rotor 38, e.g., on the opposite side of where the first mating face 120A is joined to the outer shell 110. In some embodiments, e.g., FIG. 4, the first mating face 120A may be positioned adjacent to the first component without touching the first component. For example, the first mating face 120A and the first component (e.g., rotor 38) may define the gap 123, or "face seal clearance." In embodiments where the first component is the rotor 38 with the rotor mating face, the first mating face 120A may be positioned adjacent to the rotor mating face (not shown), and the gap 123 may be defined therebetween.

In additional or alternative embodiments, the second mating face 120B is coupled to the second component, or the stator 80, as shown. The second mating face 120B may additionally be coupled to a stationary portion of the second component by using any combination of bolts, interference fits, and/or other attachment methods known in the art.

Figure 6:
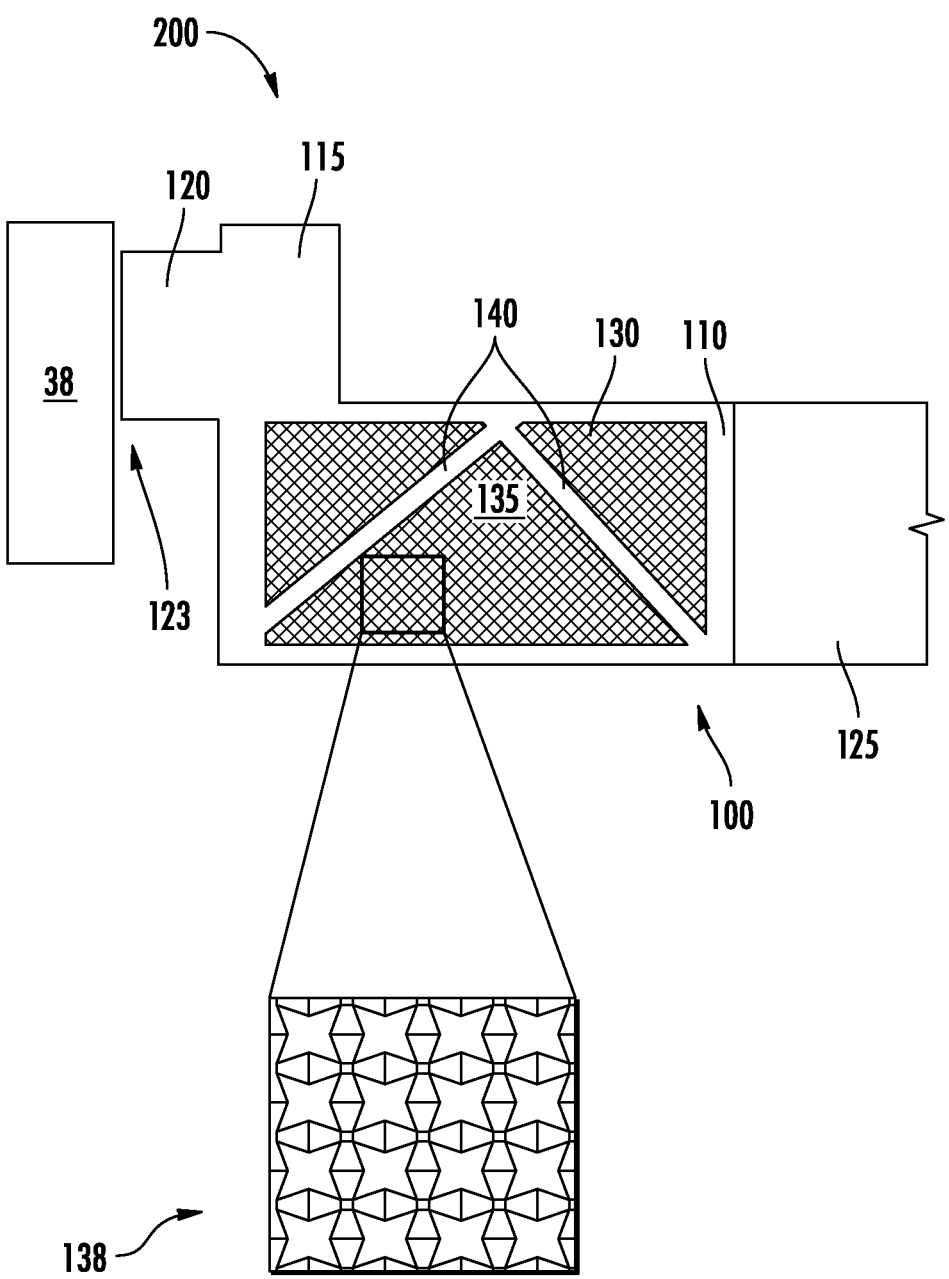
FIG. 6 is an illustration of the exemplary seal assembly according to one or more embodiments of the present disclosure.
Figure 7:
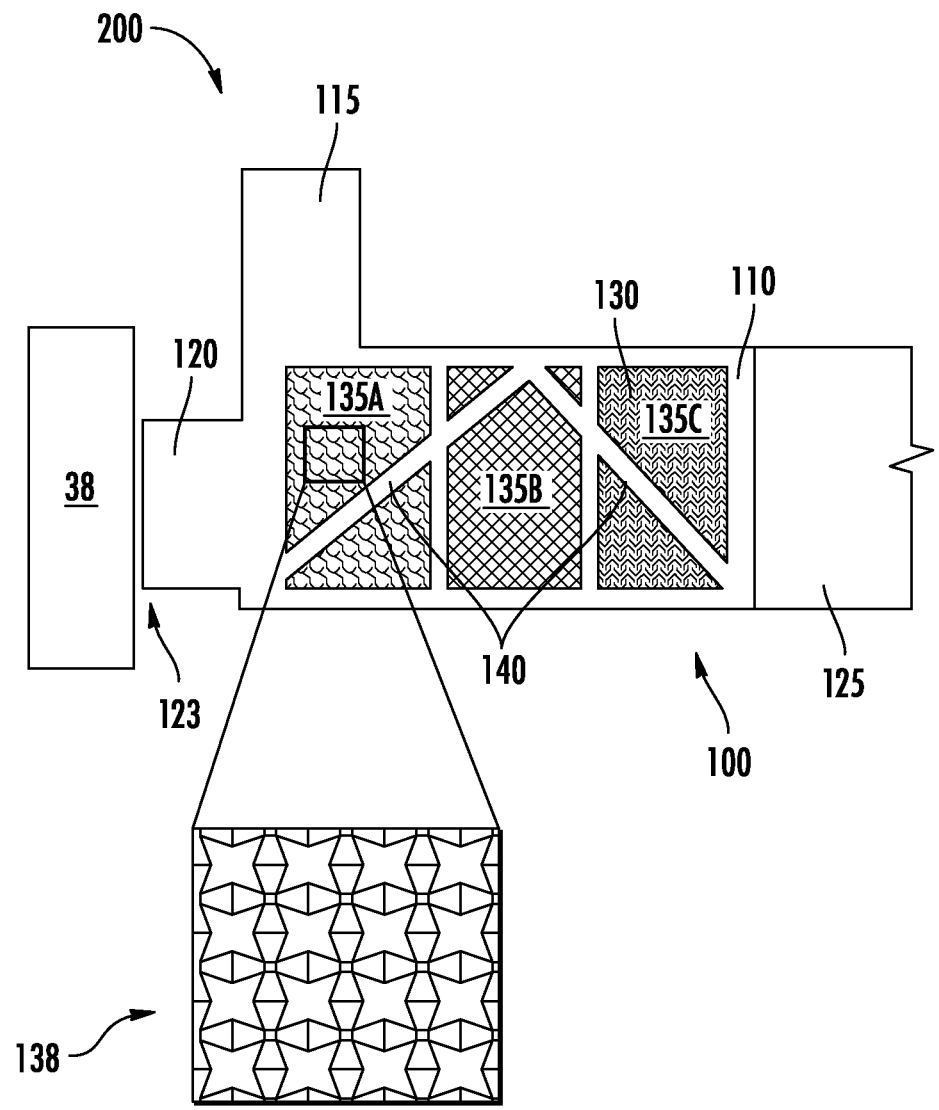
FIG. 7 is an illustration of the seal assembly with discrete regions according to one or more embodiments of the present disclosure.
Figure 8:
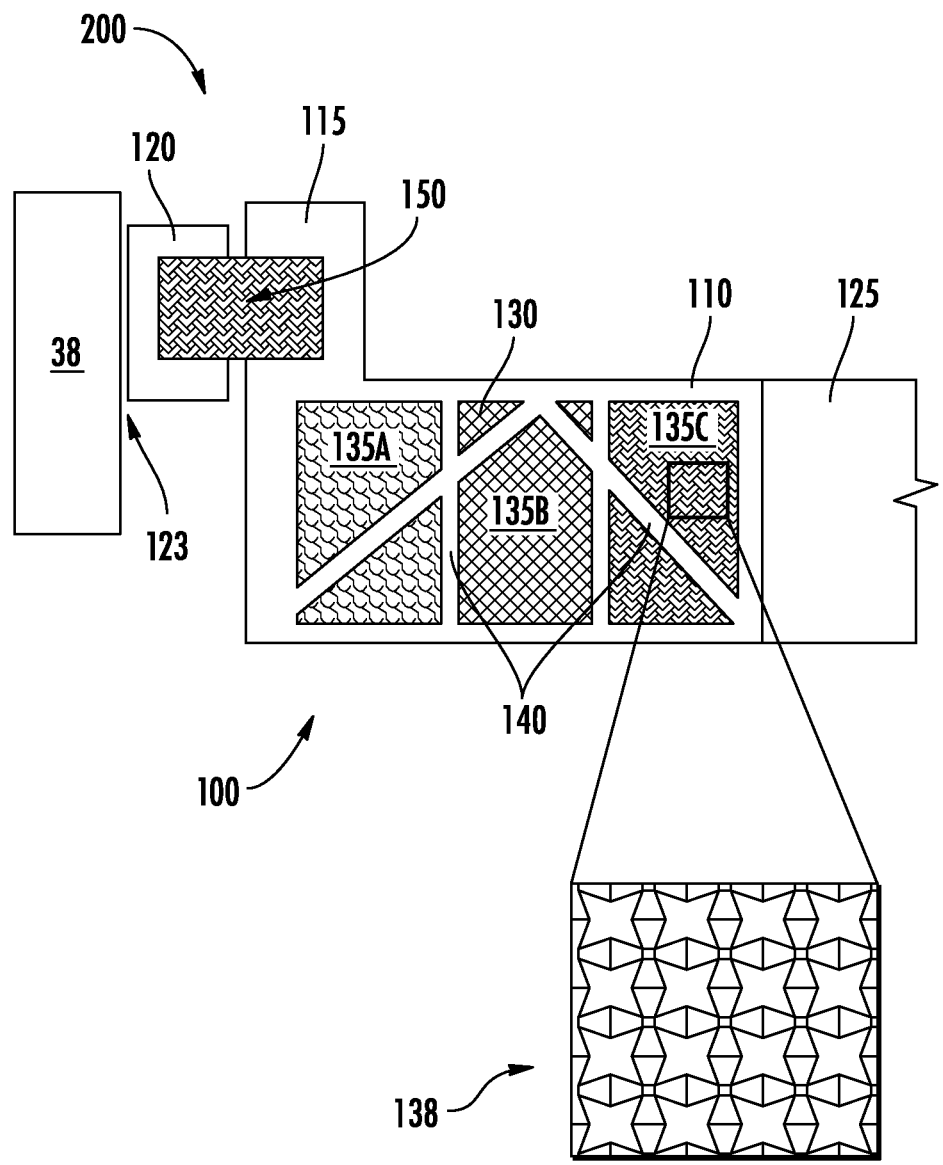
FIG. 8 is an illustration of the seal assembly with a flexible pivot according to one or more embodiments of the present disclosure.

Referring now to FIGS. 6, 7, and 8, several embodiments of the seal assembly 200 are shown. In the depicted figures, only a portion of the seal assembly 200 is shown. The outer shell 110 further defines an interior space and includes an inner matrix 130 filling the interior space of the outer shell 110. The seal 100 also has one or more support struts 140 extending throughout the inner matrix 130. Additionally, the inner matrix 130 has a mesostructure that is composed of plurality of unit cells 138, where the plurality of unit cells 138 include one or more metamaterials 137. In particular, the one or more metamaterials 137 may include cellular lattice elements 139 that are periodically repeated in space. As used herein, "unit cell" refers to the smallest repeated unit that shows the three-dimensional pattern of a metamaterial of the one or more metamaterials 137. In exemplary embodiments, at least a portion of the plurality of unit cells 138 are identical, and the plurality of unit cells 138 are repeated throughout the inner matrix 130. It will also be appreciated that, in additional and/or alternative embodiments, the inner matrix 130 may include more than one plurality of unit cells 138, such as two or more pluralities of unit cells, with each plurality having different configurations of unit cells and/or different metamaterials of the one or more metamaterials 137.

Figure 9:
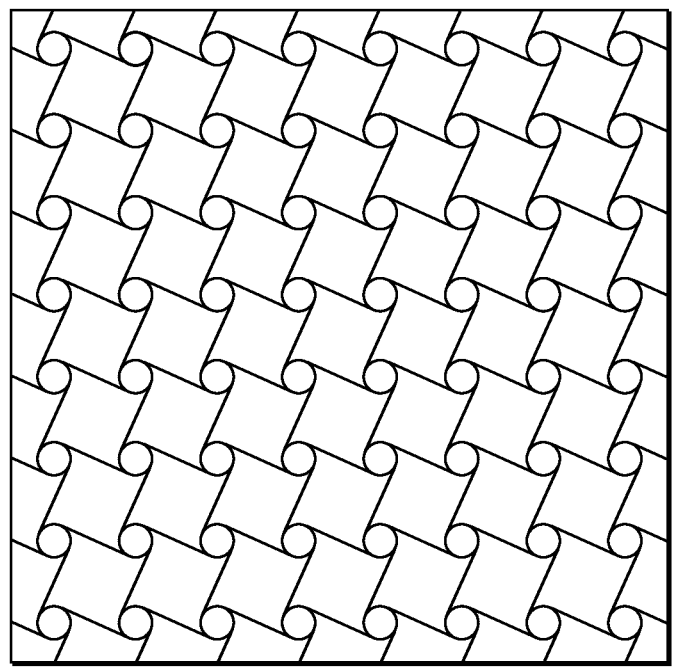
FIG. 9 is an illustration of an example of the internal structure of the plurality of unit cells.

Further, in some embodiments, the plurality of unit cells 138 may have a chiral lattice composite structure, such as the chiral lattice composite structure shown in FIG. 9. Unlike ordinary crystals, the properties of the plurality of unit cells 138 may be changed by selecting different types of metamaterials for the one or more metamaterials 137. Further, the one or more metamaterials 137 may be modified by changing the geometry of the cellular lattice elements 139. For example, the plurality of unit cells 138 may include a cubic lattice. In other embodiments, the plurality of unit cells 138 may alternatively include circular lattices. It will be appreciated, however, that the one or more metamaterials 137 may include any geometry of cellular lattice elements 139 within the plurality of unit cells 138. In exemplary embodiments, the one or more metamaterials 137 may include at least one metal. For example, the at least one metal may include stainless steel, steels, aluminum, brass, copper, and/or combinations or superalloys thereof. The one or more metamaterials 137 may additionally and/or alternatively include plastics, composites, ceramics, elastomers, and the like.

The outer shell 110 may have a variety of shapes and include multiple portions. For example, the outer shell 110 may define a base portion and an extended portion 115. In some embodiments, for example, the outer shell 110 has a polygonal shape, as shown in FIGS. 6, 7, and 8. The polygonal shape may include two or more shapes, such as an extended portion 115 of a rectangular shape extending from the base portion of the outer shell 110, which may also be a rectangular shape. Also as shown in FIGS. 6, 7, and 8, the extended portion 115 extends along the side adjacent to the at least one mating face 120 in some embodiments; however, it will be appreciated that the extended portion 115 of the outer shell 110 may alternatively or additionally extend from the opposite side of the at least one mating face 120 in other embodiments. It will be appreciated, however, that the outer shell 110 may have any other shape, e.g., a round shape. The extended portion 115 extending from the outer shell 110 may similarly be a rectangle, a circle, an elliptical, and/or any other shape.

The outer shell 110 may be made of a material such as any non-metal. In other embodiments, the outer shell 110 may be made of a metal material, e.g., steel, titanium, nickel, and/or superalloys thereof. In particular, the outer shell 110 may be an impermeable shell configured to hold the inner matrix 130 in the interior space defined by the outer shell 110. Further, the outer shell 110 may also have a shell coefficient of thermal expansion value but the seal 100 overall may have zero face distortion when in use, e.g., during operation, of the turbomachine 10 due to the structure of the inner matrix 130, as explained more in depth below. The coefficient of thermal expansion of the seal assembly 200 may be referred to herein as the "net coefficient of thermal expansion." The thickness of the outer shell 110 may also scale with the inner matrix 130, e.g., based on the change in Poisson's ratio values of the inner matrix 130.

Additionally, in certain non-limiting embodiments, the seal 100 may be a film riding seal and/or a labyrinth seal. As used herein, "film riding seal" refers to a seal that operates on a film clearance. For example, the film may be a gas film that separates the seal 100 from the rotor 38. In other embodiments, the film may be a fluid film. A "labyrinth seal" refers to a seal that has a tortuous path, e.g., a path with multiple grooves, in order to prevent leakage. In areas of large temperature gradients in particular, the seal 100 may be a film riding seal such that the seal 100 floats above the internal components of the turbomachine 10. Further, in exemplary embodiments, a cooling system is not required to help manage the thermal distortion of the seal 100, which may eliminate the need for aspirating holes and low leakage seals, e.g., in aspirating face seals. The seal 100 may therefore have large diameters, such as about 50 inches or larger (about 127 cm or larger), about 60 inches or larger (about 152 cm or larger), about 70 inches or larger (about 178 cm or larger), or about 80 inches or larger (about 203 cm or larger). Additionally, the internal structure of the seal 100 as described above allows the seal 100 to maintain the gap 123 so that it is as small as possible without touching the first component or rotor 38. The gap 123 may be as small as about 0.02 inches or less (about 0.05 cm or less), such as about 0.01 inches or less (about 0.03 cm or less), such as about 0.005 inches or less (about 0.0127 cm or less), or such as about 0.001 inches or less (about 0.00254 cm or less).

Generally, the seal 100 may be prone to distortion under extreme operating conditions, e.g., high temperatures, high speeds, and/or high-pressures. The extreme temperature gradient may be from about 2000° F. (1093° C.) to about 50° F. (10° C.), from about 1800° F. (982° C.) to about 80° F. (27° C.), or from about 1500° F. (816° C.) to about 100° F. (38° C.). Of particular concern is the resulting deformation or coning, either inwardly or outwardly, of the seal 100 due to thermal loads and/or pressure loads. The seal 100 may located between the high-pressure compressor 24 and the low-pressure compressor 22 and/or between the high-pressure turbine 28 and the low-pressure turbine 32, each of which may subject the seal 100 to an extreme temperature gradient, thereby further distorting the seal 100 due to thermal expansion. For example, in FIGS. 4 and 5, the seal assembly 200 is located between the rotor 38 and the stator 80. Additionally, the exemplary seal 100 as described herein would be useful as a hybrid face seal for the high-pressure turbine 28, and, in particular, the forward wheelspace of the high-pressure turbine 28.

A seal with a zero coefficient of thermal expansion means that the seal 100 undergoes minimal or zero thermal distortion. Specifically, the seal 100 may have a bearing face coning of less than about 0.20 mils (0.0002 inches), such as less than about 0.10 mils (0.0001 inches), such as about 0.05 mils (0.00005 inches). A negative or zero coefficient of thermal expansion may be achieved by changing the geometry and/or the one or more metamaterials 137 of the cellular lattice elements 139 within the plurality of unit cells 138, as explained previously. In embodiments where the one or more metamaterials 137 only includes one metal, however, and if the one or more metamaterials 137 has an effective Poisson's ratio close to zero, the seal 100 may decouple axial and/or radial thermal distortions. Other parameters that may change the properties of the one or more metamaterials 137 may include, but are not limited to, orientation, topology, and/or other physical parameters.

As mentioned previously, the thickness of the outer shell 110 may also scale with the inner matrix 130, e.g., based on the change in Poisson's ratio values of the inner matrix 130. In particular, the thickness of the outer shell 110 may proportionally increase with the change in Poisson's ratio values of the inner matrix 130. For example, the proportionality may be sublinear, linear, or super linear.

In some embodiments, the inner matrix 130 may further include one or more regions 135, such as a first region 135A, a second region 135B, and a third region 135C, where each of the first region 135A, the second region 135B, and the third region 135C has a regional coefficient of thermal expansion value. The differences in the regional coefficient of thermal expansion values between each of the one or more regions 135 may, at least in part, be due to different metamaterials of the one or more metamaterials 137 in each of the one or more regions 135. In certain non-limiting embodiments, adjacent regions (e.g., the first region 135A/the second region 135B and the second region 135B/the third region 135C) may have different regional coefficient of thermal expansion values. Further, the different regional coefficient of thermal expansion values may have alternating negative or positive values. For example, the first region 135A and the third region 135C may both have positive regional coefficient of thermal expansion values, e.g., where the first region 135A and the third region 135C expand under heat, while the second region 135B has a negative regional coefficient of thermal expansion value and shrinks under heat to offset the expansion of the first region 135A and the third region 135C. In other embodiments, the regions may not have alternating negative or positive regional coefficient of thermal expansion values, but some regions of the one or more regions 135 may have negative regional coefficient of thermal expansion values while other regions of the one or more regions 135 have positive regional coefficient of thermal expansion values. Still other regions of the one or more regions 135 may have neutral regional coefficient of thermal expansion values.

The different regional coefficient of thermal expansion values may additionally form a functional property gradient 145, where the functional property gradient 145 has a net coefficient of thermal expansion value between about −1e-6 to about 1e-6. In other embodiments, the net coefficient of thermal expansion value may be between about −1e-7 to about 1e-7. The one or more metamaterials 137 may be tailored in each of the one or more regions 135 by using different shapes or different materials and/or by changing the effective stiffness or coefficient of thermal expansion of each of the one or more regions 135. By way of example, e.g., as shown in FIGS. 6, 7, and 8, the one or more regions 135, such as the first region 135A, the second region 135B, and the third region 135C may each include different cellular lattice elements 139 and/or different one or more metamaterials 137. The net coefficient of thermal expansion of the functional property gradient 145 may additionally account for the shell coefficient of thermal expansion of the outer shell 110 such that the seal 100 would have a net coefficient of thermal expansion of zero and would have a reduced or zero thermal distortion. Additionally, although the first region 135A, the second region 135B, and the third region 135C are shown discretely, it will be appreciated that the one or more regions 135 may also be connected, with continuous transitions between the first region 135A, the second region 135B, and the third region 135C.

Further, the seal assembly 200 may have a target coefficient of thermal expansion value of the net coefficient of thermal expansion value, e.g., a coefficient of thermal expansion that would be preferred for the seal assembly 200. This target coefficient of thermal expansion value may depend at least in part on the component that the seal assembly 200 is coupling to and/or the specific region of the turbomachine 10 within which the seal assembly 200 will be placed. In exemplary embodiments, the target coefficient of thermal expansion value of the seal 100, and, more specifically, the functional property gradient 145, is about 0.

In yet other embodiments, the one or more regions 135 may have the same one or more metamaterials 137. These one or more metamaterials 137 may be selected based on a first material 118 used for the outer shell 110. The first material 118 may have a coefficient of thermal expansion, e.g., a shell coefficient of thermal expansion. The one or more metamaterials 137 for the inner matrix 130 may be selected to offset the shell coefficient of thermal expansion such that the net coefficient of thermal expansion for the seal 100 and/or seal assembly 200 is about or less than about 0.

Further, as shown in FIGS. 6, 7, and 8, the seal 100 includes one or more support struts 140 extending throughout the inner matrix 130 and/or the interior space defined by the outer shell 110. In exemplary embodiments, the one or more support struts 140 are in contact with at least one side of the outer shell 110. Although the one or more support struts 140 are shown in a V-configuration, it will be appreciated that the one or more support struts 140 may instead be positioned in any configuration that may support the seal 100. In addition, the one or more support struts 140 may be the same material as the outer shell 110. However, it will be appreciated that in some alternative embodiments, the one or more support struts 140 are of a different material than the outer shell 110. In some embodiments, the one or more support struts 140 may further be used to divide the inner matrix 130 into the one or more regions 135.

It will be appreciated that the seal assembly 200 may be coupled to a stationary portion of the turbomachine 10, e.g., a component or a part of a component, by using any combination of bolts, interference fits, and/or other attachment methods known in the art. In some embodiments, the seal assembly 200 is positioned adjacent and/or coupled to a high-pressure compressor 24 of the turbomachine 10. In other embodiments, as illustrated, the seal assembly 200 may additionally and/or alternatively be positioned next to and/or coupled to the turbomachine 10 at the stator 80. However, it will be appreciated that the seal assembly 200 may instead be positioned anywhere within the turbomachine 10 where a seal may be needed, especially in areas of extreme operating conditions.

Further, the seal 100 and one or more parts of the seal assembly 200 may be manufacture via additive manufacturing, such as via a 3D printing process. As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laser jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

Referring now to FIG. 8 specifically, the seal assembly 200 may further include a flexible pivot 150 coupled to the seal 100. The flexible pivot 150 may generally have one or more flexible regions (not shown), where the one or more flexible regions are made out of any of the materials listed for the inner matrix 130 (e.g., the one or more metamaterials 137) and/or the outer shell 110. Other regions of the flexible pivot 150 may include and/or be entirely comprised of solid metals, e.g., steel, titanium, nickel, and/or superalloys thereof.

Further, as illustrated, the flexible pivot 150 may be coupled to the at least one mating face 120 and/or the extended portion 115. The flexible pivot 150 may be coupled to the at least one mating face 120 and/or the outer shell 110 during manufacturing, e.g., during the 3D printing process. In other embodiments, the flexible pivot 150 is coupled to the outer shell 110 and/or the at least one mating face 120 via fasteners, bolts, and/or any other types of attachments. The flexible pivot 150 may further help prevent a face of the seal 100 from distorting. For example, if the flexible pivot 150 is coupled to the at least one mating face 120, the flexible pivot 150 may allow the rest of the seal 100 to distort while preventing the at least one mating face 120 from distorting. Preventing the at least one mating face 120 from distorting helps maintain the integrity of the seal 100, allowing the seal 100 to be used for a longer time, despite extreme operating conditions. It will be appreciated the configuration of the seal assembly 200 further allows the flexible pivot 150 and/or the at least one mating face 120 to be changed out and/or repaired, e.g., in cases of damage, if necessary.

The flexible pivot 150 may further be positioned in any manner around the outer shell 110 of the seal 100. In some embodiments, the flexible pivot 150 is coupled to the seal 100 such that it is centered along a side of the outer shell 110. However, the flexible pivot 150 may alternatively be offset along the side of the outer shell 110, e.g., either towards the inner diameter or the outer diameter of the at least one mating face 120, such as the first mating face 120A. In still other embodiments, the flexible pivot 150 may have varying geometries. For example, the flexible pivot 150 may have an elongated shape such as a rectangular shape with a small width and a long length. The flexible pivot 150 may alternatively have a circular, elliptical, and/or rounded square shape. The flexible pivot 150 may have varying internal structure as well. In some embodiments, the internal structure of the flexible pivot 150 may be interrupted, e.g., with discrete sections of materials and/or have a perforated structure. In yet other embodiments, the flexible pivot 150 may have stacked shims to increase compliance of the flexible pivot 150. These stacked shims may be located on the coupling mechanism between the flexible pivot 150 and the outer shell 110. The stacked shims may include any kind of material, including metamaterials.

Additionally, the flexible pivot 150 may be a first flexible pivot 150A, and the seal assembly 200 may further include a second flexible pivot 150B. The additional flexible pivots may each be coupled to an additional mating face, e.g., the second mating face 120B, to allow the seal assembly 200 to better attach to the turbomachine 10. For example, a flexible pivot 150 and/or at least one mating face 120 may position the seal assembly 200 around the circumference of the high-pressure compressor 24. It will be appreciated that the seal assembly 200 may additionally have three flexible pivots, four flexible pivots, five flexible pivots, and/or any other number of flexible pivots. The additional flexible pivots may each be coupled to each of the at least one mating face 120. The additional flexible pivots may alternatively form groups of flexible pivots, where each group of flexible pivots may be coupled to each of the at least one mating face 120.

Figure 10:
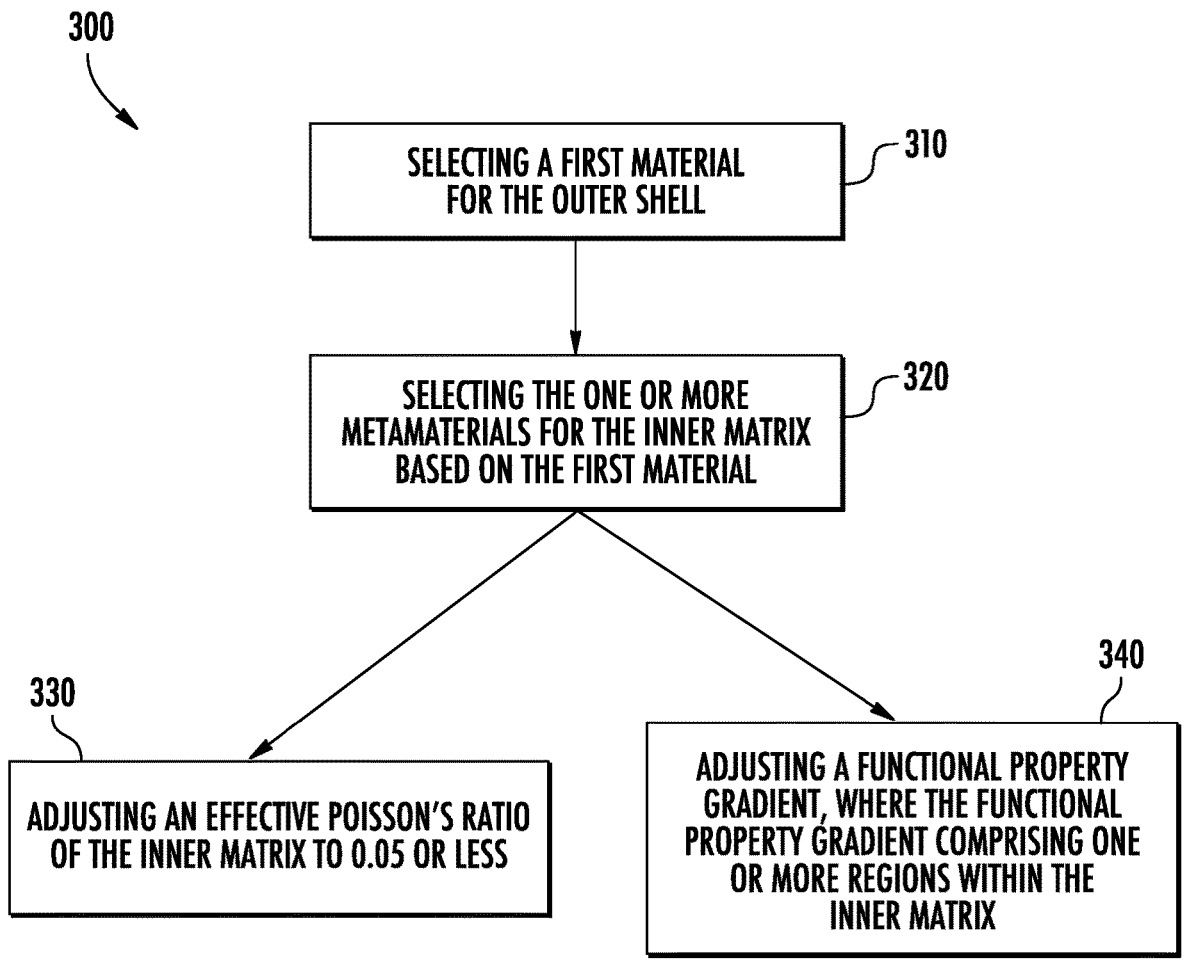
FIG. 10 is a flowchart of a method for building the seal assembly according to one or more embodiments of the present disclosure.

Referring now to FIG. 10, an exemplary method 300 for building a seal assembly 200 is shown. Generally, the method 300 includes, at 310, selecting a first material 118 for the outer shell 110, the first material 118 defining a shell coefficient of thermal expansion; and, at 320, selecting the one or more metamaterials 137 for the inner matrix 130 based on the first material 118. Further, the one or more metamaterials 137 define a net matrix coefficient of thermal expansion, and at least one of selecting the first material 118 for the outer shell 110 and selecting the one or more metamaterials 137 for the inner matrix 130 based on the first material 118 includes, at 330, adjusting an effective Poisson's ratio of the inner matrix 130 to 0.05 or less; and/or, at 340, adjusting a functional property gradient 145, the functional property gradient 145 including one or more regions 135 within the inner matrix 130. Adjusting the coefficient of thermal expansion of the seal 100 in such a manner as described herein may help reduce leaks in the seal, as no cooling is required.

In particular, at 310, selecting a first material 118 for the outer shell 110, the first material 118 defining a shell coefficient of thermal expansion, includes selecting a material that may be offset by the coefficient of thermal expansion of the inner matrix 130. Further, the first material 118 may be at least one of any non-metal. In other embodiments, the outer shell 110 may be made of a metal material, e.g., steel, titanium, nickel, and/or superalloys thereof, as mentioned above. The selection of the first material 118 may depend at least in part on the target coefficient of thermal expansion value, where the target coefficient of thermal expansion value is about 0.

At 320, selecting the one or more metamaterials 137 for the inner matrix 130 based on the first material 118, wherein the one or more metamaterials define a net matrix coefficient of thermal expansion, may include calculating a target net coefficient of thermal expansion value needed to achieve. This target net coefficient of thermal expansion value for the one or more metamaterials 137 may depend at least in part on the first material 118, the one or more metamaterials 137, and/or the geometry of the plurality of unit cells 138. In particular, the difference between the coefficient of thermal expansion of the first material 118 and the coefficient of thermal expansion of the one or more metamaterials 137 may be a factor that affects the targeted net coefficient of thermal expansion. After the targeted net coefficient of thermal expansion is known, the one or more metamaterials 137 for the inner matrix 130 may be selected. However, it will be appreciated that the one or more metamaterials 137 for the inner matrix 130 may be selected prior to selecting the first material 118 for the outer shell 110. In such embodiments, the shell coefficient of thermal expansion may be tailored to offset the net coefficient of thermal expansion of the inner matrix 130.

Additionally, at least one of selecting the first material 118 for the outer shell 110 and selecting the one or more metamaterials 137 for the inner matrix 130 based on the first material 118 may include adjusting an effective Poisson's ratio of the inner matrix 130 to 0.05 or less; and adjusting a functional property gradient 145, the functional property gradient 145 including one or more regions 135 within the inner matrix 130. For example, the Poisson's ratio may be adjusted by specific selections of the one or more metamaterials 137 for the inner matrix 130. In other embodiments, Poisson's ratio may be adjusted by altering the geometry of the unit cell, e.g., altering the topology of the unit cell, relative shape and/or size of various features of one of the plurality of unit cells 138, or arranging the plurality of unit cells 138 in a specific formation.

Furthermore, where the functional property gradient 145 is adjusted, each of the one or more regions 135 may have a different metamaterial of the one or more metamaterials 137. Constitutive materials of the one or more metamaterials 137 may be altered by changing the geometry of one or more of the plurality of unit cells 138, including, e.g., shape, size, and/or orientation of the one or more of the plurality of unit cells 138. In some embodiments, the method 300 may further include assembling the outer shell 110 and the inner matrix 130. Assembling the outer shell 110 and the inner matrix 130 may include filling the interior space of the outer shell 110 with the inner matrix 130. In other embodiments, assembling the outer shell 110 and the inner matrix 130 includes 3D printing the seal assembly 200. As mentioned previously, one or more parts of the seal assembly 200 may be printed simultaneously.

In additional and/or alternative embodiments, the method 300 may further include extruding the one or more support struts 140 prior to assembling the outer shell 110 and the inner matrix 130. In yet other embodiments, e.g., where the seal assembly 200 includes the flexible pivot 150, the method 300 may include adjusting a position of the flexible pivot 150 based on the coefficient of thermal expansion of the one or more metamaterials 137. For example, if the coefficient of thermal expansion of the one or more metamaterials 137 is negative, the flexible pivot 150 may allow for a slightly larger gap 123 between the at least one mating face 120 and the component of the turbomachine 10 that the seal assembly 200 is adjacent to.

The method 300 may additionally include adjusting a position of the flexible pivot 150 based on the net coefficient of thermal expansion of the seal assembly 200. The flexible pivot 150 may have a coupling mechanism that includes a point of attachment and couples the flexible pivot 150 to the outer shell 110 of the seal 100. The flexible pivot 150 may rotate about its point of attachment to the outer shell 110 such that the at least one mating face 120 of the seal assembly 200, e.g., the first mating face 120A, maintains its parallelism with respect to the mating surface of the rotor 38, thereby preventing rubbing and/or friction against the rotor 38.

Further, in some embodiments, the method 300 may also include designing the seal assembly 200. For example, designing the seal assembly 200 may include using analytical tool such as topology optimization. Topology optimization may be used to design the functional property gradient 145 and/or the one or more regions 135 to optimize the inner matrix 130 to accommodate deformations and/or displacements of the seal 100.

Exemplary embodiments of a seal and seal assembly are described above in detail. The systems and methods are not limited to the specific embodiments described herein, but rather, components of systems and/or steps of methods may be utilized independently and separately from other components and/or steps described herein. For example, the system may also be used in combination with other machines and methods, and is not limited to practice with only a steam turbine assembly as described herein. Rather, the embodiments can be implemented and utilized in connection with many other machine applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A seal for a turbomachine, the seal comprising: an outer shell defining an interior space; an inner matrix filling the interior space comprising a plurality of unit cells comprising one or more metamaterials, wherein at least a portion of the plurality of unit cells are identical, and wherein the plurality of unit cells are repeated throughout the inner matrix; and one or more support struts extending throughout the inner matrix.

The seal of any preceding clause, wherein the seal is at least one of a film riding seal or a labyrinth seal.

The seal of any preceding clause, wherein the plurality of unit cells further comprise a chiral lattice composite structure.

The seal of any preceding clause, wherein the inner matrix further comprises one or more regions, wherein each region has a regional coefficient of thermal expansion value, and wherein adjacent regions have different regional coefficient of thermal expansion values.

The seal of any preceding clause, wherein the different regional coefficient of thermal expansion values form a functional property gradient with a net coefficient of thermal expansion value, and wherein the net coefficient of thermal expansion value is between about −1e-6 to about 1e-6.

The seal of any preceding clause, wherein a target coefficient of thermal expansion value for the net coefficient of thermal expansion value is about 0.

The seal of any preceding clause, wherein the inner matrix further comprises one or more regions, wherein each of the one or more regions comprise the same one or more metamaterials.

A seal assembly for a component of a turbomachine, the seal assembly comprising: at least one mating face positioned adjacent to the component; and a seal coupled to the at least one mating face, the seal comprising: an outer shell defining an interior space; an inner matrix filling the interior space comprising a plurality of unit cells comprising one or more metamaterials, wherein at least a portion of the plurality of unit cells are identical, and wherein the plurality of unit cells are repeated throughout the inner matrix; and one or more support struts extending throughout the inner matrix.

The seal assembly of any preceding clause, wherein the inner matrix further comprises one or more regions, wherein each region has a regional coefficient of thermal expansion value, and wherein adjacent regions have different regional coefficient of thermal expansion values.

The seal assembly of any preceding clause, wherein the different regional coefficient of thermal expansion values form a functional property gradient with a net coefficient of thermal expansion value, and wherein the net coefficient of thermal expansion value is between about −1e-6 to about 1e-6.

The seal assembly of any preceding clause, wherein a target coefficient of thermal expansion value for the net coefficient of thermal expansion value is about 0.

The seal assembly of any preceding clause, the seal assembly further comprising: a flexible pivot coupled to the outer shell, wherein the flexible pivot comprises one or more flexible regions.

The seal assembly of any preceding clause, wherein the component is a first component and the at least one mating face comprises a first mating face positioned adjacent to the first component, and wherein a gap is defined between the first mating face and the first component.

The seal assembly of any preceding clause, wherein the turbomachine comprises a second component, and wherein the seal assembly further comprises: a second mating face, wherein the second mating face is coupled to the second component.

The seal assembly of any preceding clause, the seal assembly further comprising: a spring positioned between the seal and the component; and a ring carrier configured to attach the seal to the spring.

A method for building a seal assembly, the seal assembly comprising a mating face and a seal, wherein the seal comprises an outer shell defining an interior space, an inner matrix filling the interior space comprising a plurality of unit cells comprising one or more metamaterials, wherein at least a portion of the plurality of unit cells are identical, and wherein the plurality of unit cells are repeated throughout the inner matrix, and one or more support struts extending throughout the inner matrix, the method comprising: selecting a first material for the outer shell, the first material defining a shell coefficient of thermal expansion; and selecting the one or more metamaterials for the inner matrix based on the first material, wherein the one or more metamaterials define a net coefficient of thermal expansion, wherein at least one of selecting the first material for the outer shell and selecting the one or more metamaterials for the inner matrix based on the first material comprises: adjusting an effective Poisson's ratio of the inner matrix to 0.05 or less; and adjusting a functional property gradient, the functional property gradient comprising one or more regions within the inner matrix.

The method of any preceding clause, the method further comprising: assembling the outer shell and the inner matrix, wherein assembling the outer shell and the inner matrix comprises filling the interior space of the outer shell with the inner matrix.

The method of any preceding clause, the method further comprising: extruding the one or more support struts prior to assembling the outer shell and the inner matrix.

The method of any preceding clause, the method further comprising: 3D printing the seal assembly.

The method of any preceding clause, wherein the seal assembly further comprises a flexible pivot coupled to the seal, wherein the shell coefficient of thermal expansion and the net coefficient of thermal expansion define a net coefficient of thermal expansion, and wherein the method further comprises: adjusting a position of the flexible pivot based on the net coefficient of thermal expansion.

What is claimed is:

1. A seal for a turbomachine, the seal comprising:
an outer shell defining an interior space;
an inner matrix filling the interior space comprising a plurality of unit cells comprising one or more metamaterials, wherein at least a portion of the plurality of unit cells are identical, and wherein the plurality of unit cells are repeated throughout the inner matrix; and
one or more support struts extending throughout the inner matrix.

2. The seal of claim 1, wherein the seal is at least one of a film riding seal or a labyrinth seal.

3. The seal of claim 1, wherein the plurality of unit cells further comprise a chiral lattice composite structure.

4. The seal of claim 1, wherein the inner matrix further comprises one or more regions, wherein each region has a regional coefficient of thermal expansion value, and wherein adjacent regions have different regional coefficient of thermal expansion values.

5. The seal of claim 4, wherein the different regional coefficient of thermal expansion values form a functional property gradient with a net coefficient of thermal expansion value, and wherein the net coefficient of thermal expansion value is between about −1e-6 to about 1e-6.

6. The seal of claim 5, wherein a target coefficient of thermal expansion value for the net coefficient of thermal expansion value is about 0.

7. The seal of claim 1, wherein the inner matrix further comprises one or more regions, wherein each of the one or more regions comprise the same one or more metamaterials.

8. A seal assembly for a component of a turbomachine, the seal assembly comprising:
at least one mating face positioned adjacent to the component; and
a seal coupled to the at least one mating face, the seal comprising:
an outer shell defining an interior space;
an inner matrix filling the interior space comprising a plurality of unit cells comprising one or more metamaterials, wherein at least a portion of the plurality of unit cells are identical, and wherein the plurality of unit cells are repeated throughout the inner matrix; and
one or more support struts extending throughout the inner matrix.

9. The seal assembly of claim 8, wherein the inner matrix further comprises one or more regions, wherein each region has a regional coefficient of thermal expansion value, and wherein adjacent regions have different regional coefficient of thermal expansion values.

10. The seal assembly of claim 9, wherein the different regional coefficient of thermal expansion values form a functional property gradient with a net coefficient of thermal expansion value, and wherein the net coefficient of thermal expansion value is between about −1e-6 to about 1e-6.

11. The seal assembly of claim 10, wherein a target coefficient of thermal expansion value for the net coefficient of thermal expansion value is about 0.

12. The seal assembly of claim 8, the seal assembly further comprising:
a flexible pivot coupled to the outer shell, wherein the flexible pivot comprises one or more flexible regions.

13. The seal assembly of claim 8, wherein the component is a first component and the at least one mating face comprises a first mating face positioned adjacent to the first component, and wherein a gap is defined between the first mating face and the first component.

14. The seal assembly of claim 13, wherein the turbomachine comprises a second component, and wherein the seal assembly further comprises:
a second mating face, wherein the second mating face is coupled to the second component.

15. The seal assembly of claim 8, the seal assembly further comprising:
a spring positioned between the seal and the component; and
a ring carrier configured to attach the seal to the spring.

16. A method for building a seal assembly, the seal assembly comprising at least one mating face and a seal, wherein the seal comprises an outer shell defining an interior space, an inner matrix filling the interior space comprising a plurality of unit cells comprising one or more metamaterials, wherein at least a portion of the plurality of unit cells are identical, and wherein the plurality of unit cells are repeated throughout the inner matrix, and one or more support struts extending throughout the inner matrix, the method comprising:
selecting a first material for the outer shell, the first material defining a shell coefficient of thermal expansion; and
selecting the one or more metamaterials for the inner matrix based on the first material,
wherein the one or more metamaterials define a net coefficient of thermal expansion,
wherein at least one of selecting the first material for the outer shell and selecting the one or more metamaterials for the inner matrix based on the first material comprises:
adjusting an effective Poisson's ratio of the inner matrix to 0.05 or less; and
adjusting a functional property gradient, the functional property gradient comprising one or more regions within the inner matrix.

17. The method of claim 16, the method further comprising:
assembling the outer shell and the inner matrix, wherein assembling the outer shell and the inner matrix comprises filling the interior space of the outer shell with the inner matrix.

18. The method of claim 17, the method further comprising:
extruding the one or more support struts prior to assembling the outer shell and the inner matrix.

19. The method of claim 16, the method further comprising:
3D printing the seal assembly.

20. The method of claim 16, wherein the seal assembly further comprises a flexible pivot coupled to the seal, wherein the shell coefficient of thermal expansion and the net coefficient of thermal expansion define a net coefficient of thermal expansion, and wherein the method further comprises:
adjusting a position of the flexible pivot based on the net coefficient of thermal expansion.

* * * * *